(12) United States Patent
Mori et al.

(10) Patent No.: US 7,229,125 B2
(45) Date of Patent: Jun. 12, 2007

(54) SUNSHADE DEVICE FOR VEHICLE

(75) Inventors: Keiji Mori, Kariya (JP); Akihiro Kato, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/166,201

(22) Filed: Jun. 27, 2005

(65) Prior Publication Data

US 2005/0285434 A1    Dec. 29, 2005

(30) Foreign Application Priority Data

Jun. 28, 2004  (JP) ............................. 2004-189658
May 16, 2005  (JP) ............................. 2005-142530

(51) Int. Cl.
  *B60J 7/00*  (2006.01)
(52) U.S. Cl. ..................................... 296/214
(58) Field of Classification Search ................. 296/214
  See application file for complete search history.

(56) References Cited

U.S. PATENT DOCUMENTS 4,852,938 A * 8/1989 Hirshberg et al. .......... 296/214
5,250,882 A   10/1993 Odoi et al.
5,603,372 A * 2/1997 Farmont et al. ....... 160/370.21
6,481,787 B1  11/2002 Laux et al.
6,669,279 B2 * 12/2003 Messerschmidt ....... 296/220.01

FOREIGN PATENT DOCUMENTS

DE    102 04 360      12/2003
DE    103 27 313 A1    1/2004

* cited by examiner

*Primary Examiner*—Dennis H. Pedder
(74) *Attorney, Agent, or Firm*—Finnegan, Henderson, Farabow, Garrett & Dunner, LLP

(57) ABSTRACT

A sunshade device for a vehicle includes a first panel being slidable relative to a roof panel by receiving a driving force so as to open or close an opening portion formed in the roof panel of a vehicle, a second panel being slidable by receiving a driving force from the first panel so as to open or close the opening portion, a lifting mechanism for lifting the second panel upward relative to the first panel in a predetermined sliding position, and a link member provided between the first panel and the second panel and rotatably connected to the first panel and the second panel. When the second panel is lifted upward relative to the first panel by the lifting mechanism, the link member rotates relative to the first panel and the second panel.

9 Claims, 5 Drawing Sheets

FIG. 10  Known work

FIG. 11  Known work

FIG. 12    Known work
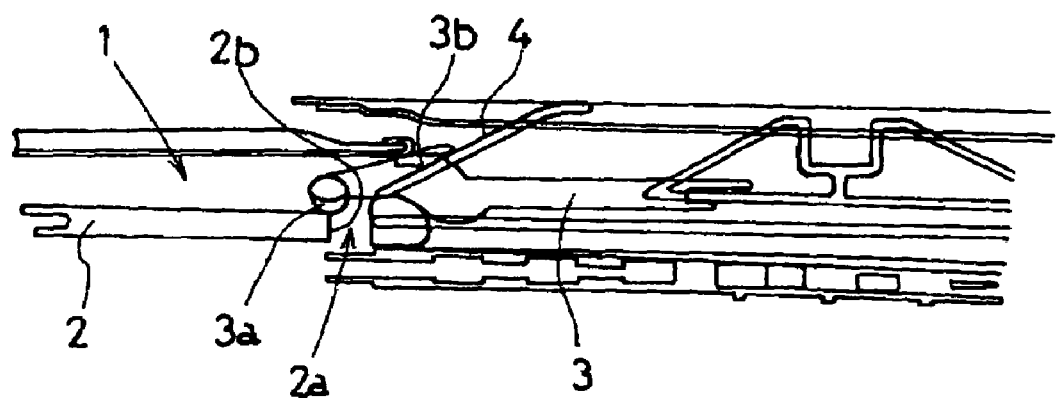

SUNSHADE DEVICE FOR VEHICLE

CROSS REFERENCE TO RELATED APPLICATIONS

This application is based on and claims priority under 35 U.S.C. § 119 to Japanese Patent Application Nos. 2004-189658 and 2005-142530, filed on Jun. 28, 2004 and May 16, 2005 respectively, the entire content of which is incorporated herein by reference.

FIELD OF THE INVENTION

This invention generally relates to a sunshade device for a vehicle.

BACKGROUND

A known sunroof for a vehicle is generally equipped with a sunshade, which is provided on a vehicle interior side of a lid for opening or closing an opening in a roof, to block sunlight in cases where the lid is formed by transparent or semi-transparent material.

Recently, more vehicles include large openings in a roof for the purposes of receiving more daylight. Then, a sunshade consisting of multiple panels (for example, 2 panels) that correspond to a size of the opening, and slide along the roof is provided to such vehicles. The sunshade is constituted such that the sunshade is moved between a deployed state in which panels are arranged side by side and a retracted state in which the panels are retracted by overlapping each other.

Such a sunshade disclosed in DE10327313A1 is explained with reference to FIGS. 10 to 12 showing a state in which the sunshade including two panels are moved from a deployed state to a retracted state.

In cases where a sunshade 1 is in the deployed state, as shown in FIG. 10, an engaging portion 2*a* formed on a slider 2 of a first panel engages, in a sliding direction, with a protruding portion 3*a* formed on a slider 3 of a second panel. At this time, a pushing face 2*b* of the engaging portion 2*a* of the slider 2 and the protruding portion 3*a* of the slider 3 are in contact with each other. That is, the first panel presses, by means of the pushing face 2*b*, the second panel in the sliding direction (i.e. rightward direction in FIGS. 10 to 12) so that the first panel and the second panel slide as a unit.

When the sunshade 1 slides to a predetermined position in the sliding direction, a cam portion 3*b* formed on the slider 3 of the second panel is made contact with a guide face 4. In such circumstances, when the first panel presses the second panel in the sliding direction, the cam portion 3*b* is guided upward (i.e. upper side in FIGS. 10 to 12) along the guide face 4. Then, as shown in FIG. 11, the slider 3 of the second panel is lifted upward relative to the slider 2 of the first panel.

When the first panel further presses the second panel in the sliding direction, the slider 3 of the second panel is lifted, by means of the cam portion 3*b* and the guide face 4, further upward relative to the slider 2 of the first panel. Then, the protruding portion 3*a* of the slider 3 disengages from the engaging portion 2*a* of the slider 2. Accordingly, the slider 3 of the second panel disengages from the slider 2 of the first panel in the sliding direction, thereby causing the first panel to be slidable relative to the second panel. The first panel slides into a lower side of the second panel (i.e. lower side in FIGS. 10 to 12) and thus the second panel overlaps the first panel. The retracted state is achieved accordingly.

According to the aforementioned sunshade, the slider 3 of the second panel is lifted upward relative to the slider 2 of the first panel since the cam portion 3*b* of the slider 3 is guided to the guide face 4. The slider 3 of the second panel eventually disengages from the slider 2 in the sliding direction. In this case, while the slider 3 disengages completely from the slider 2, the cam portion 3*b* of the slider 3 is kept pressed against the guide face 4. Thus, a large friction is generated between the cam portion 3*b* and the guide face 4. Further, the protruding portion 3*a* of the slider 3 is lifted upward while the protruding portion 3*a* is pressed against the pushing face 2*b* of the slider 2. Thus, a large friction is also generated between the protruding portion 3*a* and the pushing face 2*b*. As a result, the upward movement of the slider 3 of the second panel relative to the slider 2 of the first panel (i.e. retracting operation) may be prevented by such a friction portion.

Thus, a need exists for a sunshade device that can realize a smooth retracting operation.

SUMMARY OF THE INVENTION

According to an aspect of the present invention, a sunshade device for a vehicle includes a first panel being slidable relative to a roof panel by receiving a driving force so as to open or close an opening portion formed in the roof panel of a vehicle, a second panel being slidable by receiving a driving force from the first panel so as to open or close the opening portion, a lifting mechanism for lifting the second panel upward relative to the first panel in a predetermined sliding position, and a link member provided between the first panel and the second panel and rotatably connected to the first panel and the second panel. When the second panel is lifted upward relative to the first panel by the lifting mechanism, the link member rotates relative to the first panel and the second panel.

BRIEF DESCRIPTION OF THE DRAWINGS

The foregoing and additional features and characteristics of the present invention will become more apparent from the following detailed description considered with reference to the accompanying drawings, wherein:

FIG. 10 is a view showing a state in which a conventional sunshade is shifted from a deployed state to a retracted state;

FIG. 11 is a view showing another state in which the conventional sunshade is shifted from the deployed state to the retracted state; and FIG. 12 is a still another state in which the conventional sunshade is shifted from the deployed state to the retracted state.

DETAILED DESCRIPTION

A first embodiment of the present invention is explained with reference to the attached drawings.

Figure 1:
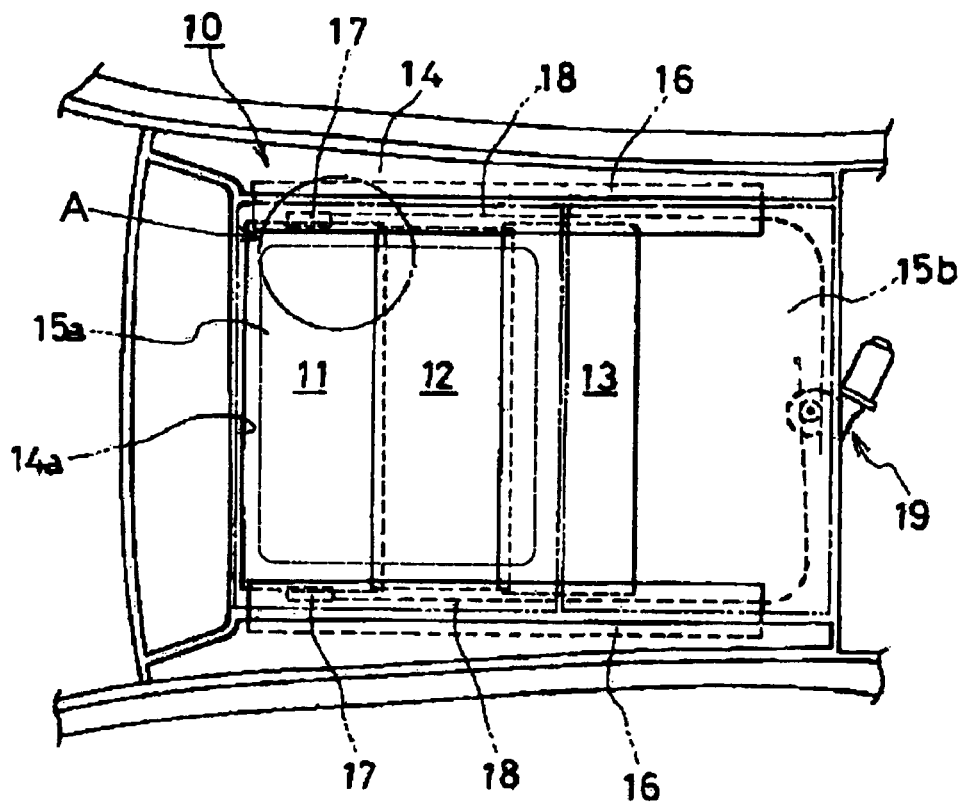
FIG. 1 is a schematic view showing a structure of a sliding sunshade according to an embodiment of the present invention.

FIG. 1 is a schematic view showing a structure of a sliding sunshade 10 (sunshade device for a vehicle) according to the present embodiment.

The sliding sunshade 10 includes three panels 11, 12 and 13. An opening 14a formed in a roof panel 14 of a vehicle is opened or closed by the sliding sunshade 10 that adjusts and controls sunlight coming into an interior of the vehicle. Glass panels 15a and 15b are respectively fixed to the opening 14a so as to cover the opening 14a. The sliding sunshade 10 is provided under the glass panels 15a and 15b so as to cover the glass panels 15a and 15b from the vehicle interior side. A vertical movement of the panels 11, 12, and 13 (i.e. in a roof vertical direction) that consist of the sliding sunshade 10 is prevented by guide rails 16 arranged on respective side edges of the roof panel 14 in a roof transverse direction (i.e. vertical direction in FIG. 1), while a longitudinal movement of the panels 11, 12, and 13 (i.e. horizontal direction in FIG. 1) is allowed in a sliding manner by the guide rails 16. The guide rails 16 extend in a roof longitudinal direction. The sliding sunshade 10 is shifted between a deployed state (see FIG. 1) in which the panels 11, 12, and 13 are arranged side by side in the roof longitudinal direction, and a retracted state (not shown) in which the panels 11, 12, and 13 are retracted by overlapping each other in a predetermined sliding position. The sliding sunshade 10 covers some part or entire part of the glass panels 15a and 15b from the vehicle interior side in the deployed state.

Driving shoes 17 are fixed to respective side edges of the panel 11 in the roof transverse direction. Each driving shoe 17 is connected to a driving mechanism 19 via a gear cable 18. When a motor of the driving mechanism 19 is powered, the gear cable 18 moves rearward (rightward in FIG. 1) or forward (i.e. leftward in FIG. 1) depending on a direction in which the motor is driven. Then, the driving shoe 17 connected to the gear cable 18 moves along the guide rail 16, thereby causing the panel 11 fixed to the driving shoe 17 to slide along the guide rail 16. That is, the panel 11 slides relative to the roof panel 14 by receiving a driving force from the driving mechanism 19.

Next, connecting links 20 respectively provided between the panels 11 and 12, and the panels 12 and 13 are explained with reference to FIGS. 2 and 3. Both connecting links 20 have the identical structure and thus the connecting link 20 provided between the panels 11 and 12 is explained below.

Figure 2:
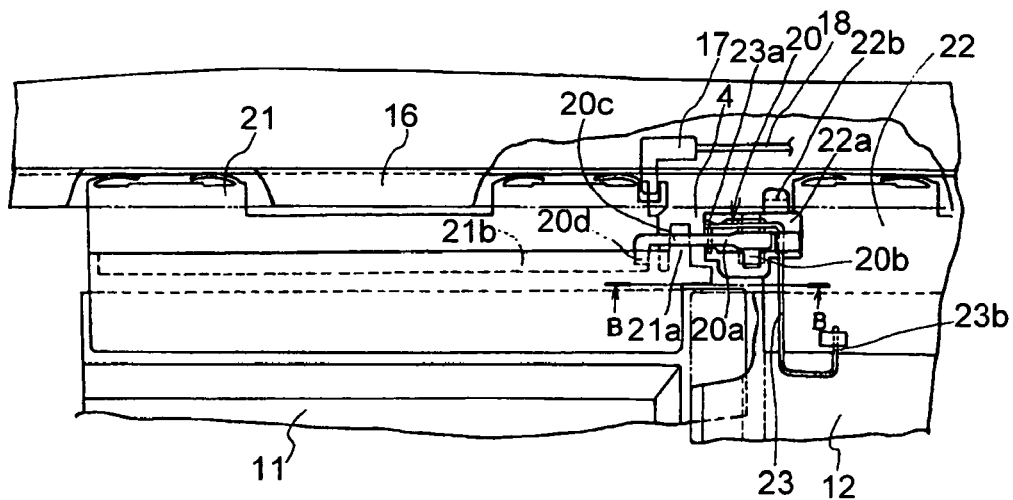
FIG. 2 is an enlarged view of an A portion in FIG. 1.
Figure 3:
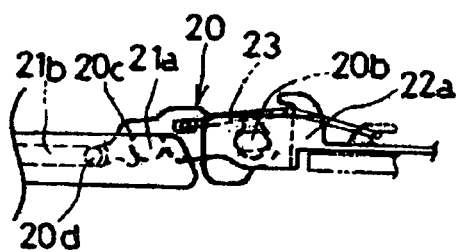
FIG. 3 is a cross-sectional view taken along the line B—B in FIG. 2.

FIG. 2 is an expanded view of an A portion in FIG. 1 while FIG. 3 is a cross-sectional view taken along the line B—B in FIG. 2.

Sliders 21 are fixed on respective side edges in the roof transverse direction of the panel 11 (first panel) while sliders 22 are fixed on respective side edges in the roof transverse direction of the panel 12 (second panel) (only one pair of sliders 21 and 22 are shown in FIG. 2). The panels 11 and 12 are slidably supported to the guide rail 16 by means of the sliders 21 and 22. The aforementioned driving shoe 17 is fixed to the slider 21. That is, a driving force of the driving mechanism 19 is transmitted to the panel 11 via the slider 21.

The connecting link 20 (link member) is provided between the sliders 21 and 22. The connecting link 20 includes a base portion 20a, a connecting shaft portion 20b, a holding portion 20c (engaging/disengaging means), and a guiding shaft portion 20d. The base portion 20a is of a plate shape and extends along the guide rail 16. The connecting shaft portion 20b is formed by extending from the base portion 20a in the roof transverse direction. The connecting shaft portion 20b is rotatably supported to a supporting portion 22a formed on the slider 22. That is, the connecting link 20 is rotatably connected to the slider 22 of the panel 12. The holding portion 20c is of a hook-like shape, and a substantially center portion of the base portion 20a is of a downwardly concave shape as shown in FIG. 3. The holding portion 20c engages with an engaging shaft portion 21a (engaging/disengaging means) in rotatable and engageable/disengagable manner. Then, the guiding shaft portion 20d is formed at a front edge of the connecting link 20 so as to extend transversely towards a vehicle inner side. The guiding shaft portion 20d engages rotatably and slidably with a guiding groove 21b of the slider 21 that extends along the guide rail 16. That is, the connecting link 20 is rotatably connected to the slider 21 of the panel 11 and slidably engages therewith.

A spring 23 (biasing member) is disposed between the connecting link 20 and the slider 22. One end 23a of the spring 23 engages with the connecting link 20 while the other end 23b engages with the slider 22. In addition, a portion of the spring 23 between the one end 23a and the other end 23b thereof engages with the supporting portion 22a of the slider 22. The connecting link 20 is constantly biased by receiving a biasing force of the spring 23 so as to rotate in a clockwise direction in FIG. 3 around the connecting shaft portion 20b.

Figure 5:
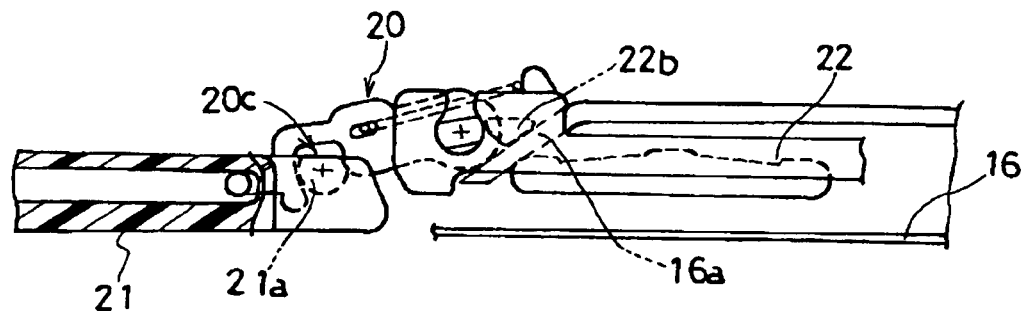
FIG. 5 is a view showing another state in which the sliding sunshade according to the first embodiment is shifted from the deployed state to the retracted state.
Figure 6:
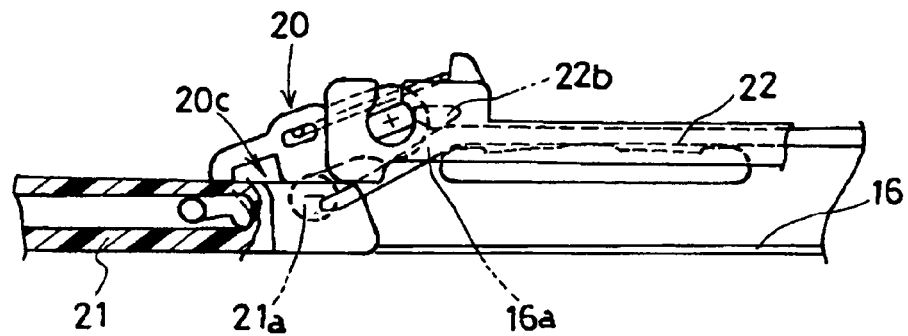
FIG. 6 is a view showing a still another state in which the sliding sunshade according to the first embodiment is shifted from the deployed state to the retracted state.

An operation obtained when the sliding sunshade 10 is shifted from the deployed state to the retracted state is explained with reference to FIGS. 4 to 6.

Figure 4:
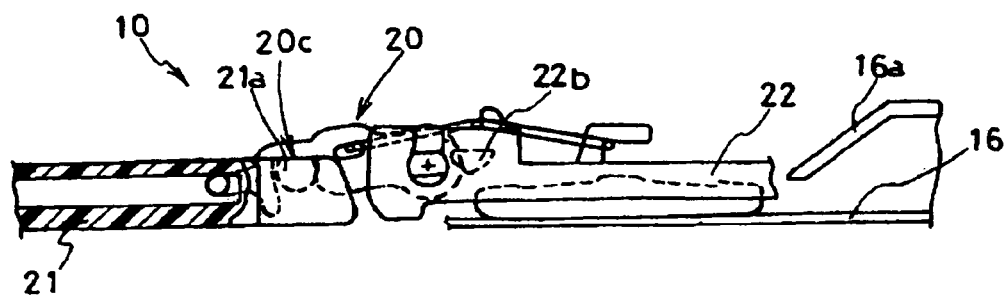
FIG. 4 is a view showing a state in which the sliding sunshade according to a first embodiment is shifted from a deployed state to a retracted state.

In cases where the sliding sunshade 10 is in the deployed state, the engaging shaft portion 21a of the slider 21 engages with the holding portion 20c of the connecting link 20 as shown in FIG. 4. At this time, a driving force of the driving mechanism 19 (see FIG. 1) is transmitted from the slider 21 to the slider 22 by means of the connecting link 20. That is, the slider 22 of the panel 12 slides by receiving a driving force from the slider 21 of the panel 11 (see FIG. 2) by means of the connecting link 20.

In this case, since the engaging shaft portion 21a of the slider 21 engages with the holding portion 20c of the connecting link 20, the connecting link 20 is not slidable relative to the panel 11. Therefore, the connecting link 20 follows the sliding panel 11, thereby causing the panel 12 connected to the connecting link 20 to slide.

When the sliding sunshade 10 slides in a roof rearward direction (i.e. rightward direction in FIG. 4) to a predetermined sliding position, a cam portion 22b (lifting mechanism) formed on the slider 22 engages with a guide face 16a (lifting mechanism) formed on the guide rail 16. In such circumstances, when the slider 21 slides in the roof rearward direction, the slider 22 is pressed by the slider 21 in the roof rearward direction (rightward direction in FIG. 5) by means of the connecting link 20, and at the same time guided upward (i.e. upper side in FIG. 5) along the guide face 16a by means of the cam portion 22b. At this time, the connecting link 20 transmits a driving force from the slider 21 to the slider 22 while rotating relative to the sliders 21 and 22, so that the slider 22 and the connecting link 20 are lifted upward relative to the slider 21.

When the slider 21 further slides in the roof rearward direction, the slider 22 and the connecting link 20 are further lifted upward relative to the slider 21 by means of the cam portion 22b engaging with the guide face 16a. With this movement, the connecting link 20 further rotates relative to the sliders 21 and 22. Eventually, the holding portion 20c of the connecting link 20 connected to the slider 22 disengages from the engaging shaft portion 21a of the slider 21 as shown in FIG. 6.

In this case, since the engaging shaft portion 21a of the slider 21 and the holding portion 20c of the connecting link 20 disengage from each other, the connecting link 20 is prevented from sliding relative to the panel 11. Thus, the connecting link 20 stops following the sliding panel 11. At this time, the slider 22 disengages from the slider 21 in the sliding direction and thus the slider 21 is slidable relative to the slider 22. Accordingly, the panel 11 slides into a lower side of the panel 12 in the roof rearward direction and thus the panel 12 overlaps the panel 11, i.e. the panel 12 is placed over the panel 11, thereby generating the retracted state of the sliding sunshade 10. A smooth retracting operation of the sliding sunshade 10 may be achieved.

According to the sliding sunshade 10 of the present embodiment, the connecting link 20 is rotatable relative to the panels 11 and 12. Thus, a flexibility of connection between the panels 11 and 12 may be increased. A portion for generating distortion, friction, and the like may be reduced between the panels 11 and 12. As a result, an upward movement of the panel 12 relative to the panel 11 (i.e. retracting operation) may not be prevented, thereby realizing a smooth retracting operation of the sliding sunshade 10.

Next, a second embodiment of the present invention is explained. In the second embodiment, a direction in which the connecting link 20 is biased by means of a spring 23, and an operation in which the slider 22 is guided along the guide face 16a are explained in detail. The other structure is same as that of the first embodiment and thus a detailed explanation is omitted.

Figure 7:
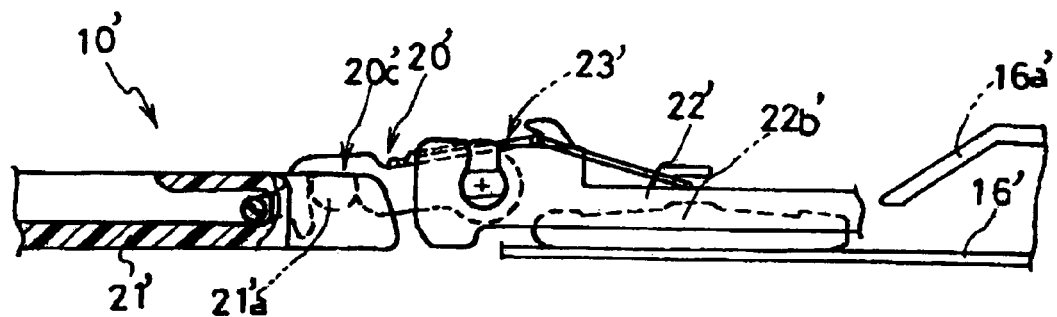
FIG. 7 is a view showing a state in which the sliding sunshade according to a second embodiment is shifted from a deployed state to a retracted state.
Figure 8:
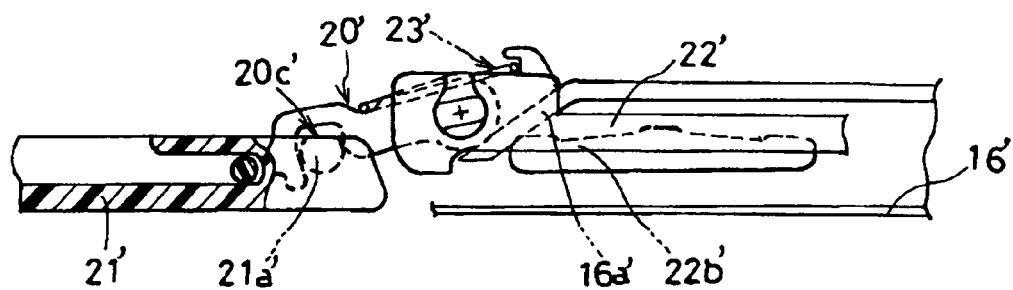
FIG. 8 is a view showing another state in which the sliding sunshade according to the second embodiment is shifted from the deployed state to the retracted state.
Figure 9:
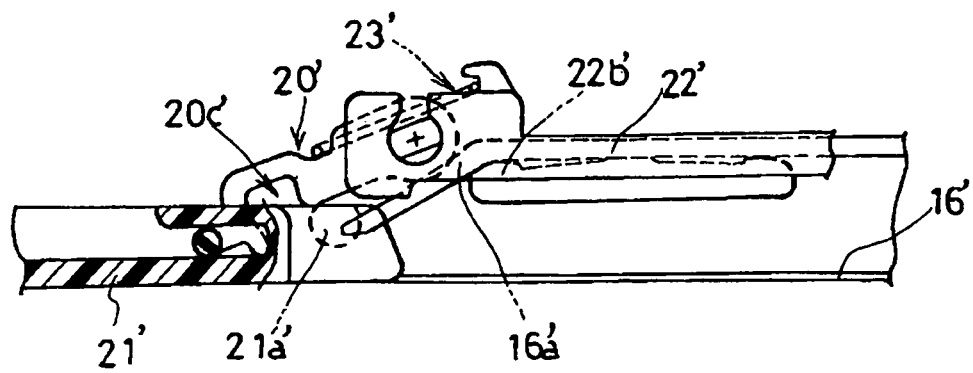
FIG. 9 is a view showing a still another state in which the sliding sunshade according to the second embodiment is shifted from the deployed state to the retracted state.
Figure 9:
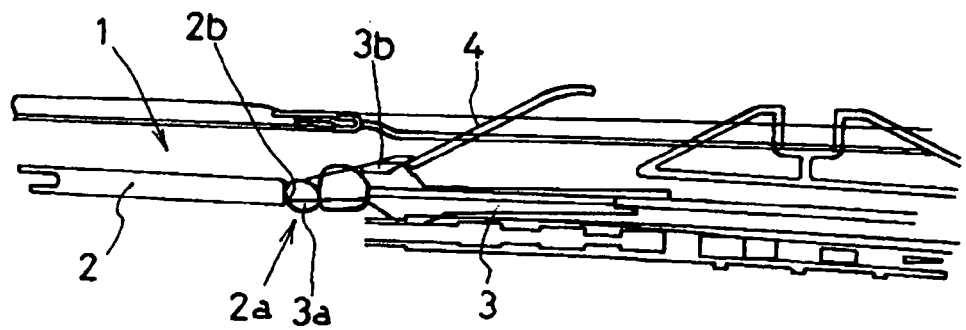
Figure 9:
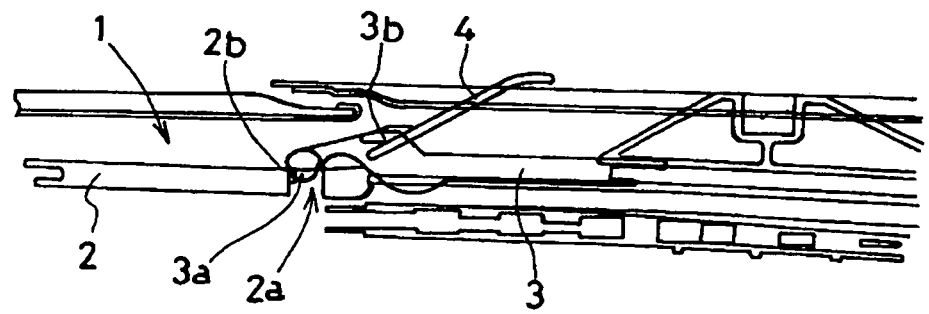

FIGS. 7 to 9 show an operation in which a sliding sunshade 10' according to the second embodiment is shifted from a deployed state to a retracted state.

In cases where the sliding sunshade 10' is in the deployed state, an engaging shaft portion 21a' of a slider 21' engages with a holding portion 20c' of a connecting link 20' as shown in FIG. 7. At this time, a driving force of the driving mechanism 19 (see FIG. 1) is transmitted from the slider 21' to a slider 22' by means of the connecting link 20'. That is, the slider 22' of the panel 12 (see FIG. 2) slides by receiving a driving force from the slider 21' of the panel 11 (see FIG. 2) by means of the connecting link 20'.

When the sliding sunshade 10' slides in a roof rearward direction (i.e. rightward direction in FIG. 7) to a predetermined sliding position, a shoe portion 22b' (lifting mechanism) formed on the slider 22' engages with a guide face 16a' (lifting mechanism) formed on a guide rail 16'. A larger biasing force than a weight of the slider 22' is constantly applied by a spring 23' (biasing means) to the connecting link 20' so that the connecting link 20' rotates upward (i.e. upper side in FIG. 7). Thus, when the slider 21' slides in the roof rearward direction with the shoe portion 22b' engaging with the guide face 16a', the slider 22' is pressed by the slider 21' in the roof rearward direction (i.e. rightward direction in FIG. 8) by means of the connecting link 20', and at the same time guided upward (i.e. upper direction in FIG. 8) along the guide face 16a' by means of the shoe portion 22b'. At this time, the connecting link 20' transmits a driving force from the slider 21' to the slider 22' while rotating relative to the sliders 21' and 22', so that the slider 22' and the connecting link 20' are lifted upward relative to the slider 21'.

When the slider 21' further slides in the roof rearward direction, the slider 22' and the connecting link 20' are further lifted upward relative to the slider 21' by means of the shoe portion 22b' engaging with the guide face 16a'. With this movement, the connecting link 20' further rotates relative to the sliders 21' and 22'. Eventually, as shown in FIG. 9, the holding portion 20c' of the connecting link 20' connected to the slider 22' disengages from the engaging shaft portion 21a' of the slider 21'. At this time, the slider 22' disengages from the slider 21' in the sliding direction and thus the slider 21' is slidable relative to the slider 22'. Accordingly, the panel 11 slides into a lower side of the panel 12 in the roof rearward direction and thus the panel 12 overlaps the panel 11, i.e. the panel 12 is placed above the panel 11, thereby generating the retracted state of the sliding sunshade 10.

According to the aforementioned embodiments, the sliding sunshade 10 is provided corresponding to the glass panels 15a and 15b fixed to the openings 14a and 14b of the roof panel 14 of the vehicle. However, for example, the sliding sunshade 10 may be provided to a known sunroof device having an opening and closing glass panel.

In addition, according to the aforementioned embodiments, the sliding sunshade 10 includes three panels 11, 12, and 13. However, the present embodiment may be employed in the sliding sunshade 10 including multiple panels (at least two panels). In this case, the connecting links 20 are provided respectively between the panels.

Further, according to the aforementioned embodiments, the panel 11 slides along the guide rail 16 by means of a driving force of the driving mechanism 19. However, the sliding sunshade 10 may slide by means of a man-power of a passenger in a vehicle.

Furthermore, an additional panel may be provided on an exterior side of the roof panel 14. In this case, an opening is formed on the additional panel so that the vehicle interior side and the exterior side are connected to each other for ventilation or receiving daylight by sliding of the panels 11, 12 and 13. Alternatively, the additional panel may be a lid formed by transparent or semi-transparent material, and daylight may be received through the opening formed on the lid by sliding of the panels 11, 12 and 13.

Furthermore, according to the aforementioned embodiments, the slider 21 that drives the slider 22, and the slider 22 lifted upward relative to the slider 21 are not in contact with each other. Thus, a portion receiving a friction does not exist between the sliders 21 and 22. As a result, an upward movement of the slider 22 of the panel 12 relative to the slider 21 of the panel 11 (i.e. retracting operation) is not prevented, thereby realizing a smooth retracting operation of the sliding sunshade 10.

Furthermore, according to the aforementioned second embodiment, the panel 12 is constantly biased by the spring 23' so as to be lifted upward relative to the panel 11 connected to the panel 12 by means of the connecting link 20'. Thus, an upward movement of the panel 12 relative to the panel 11 (i.e. retracting operation) is assisted by the spring 23', thereby realizing a smooth retracting operation of the sliding sunshade 10.

Furthermore, according to the aforementioned embodiments, the slider 22 is constantly biased by the spring 23 disposed between the connecting link 20 and the slider 22 so that the connecting link 20 rotates relative to the slider 22. Thus, in the deployed state in which the panels 11, 12, and 13 are retracted by overlapping each other, positional relationships therebetween are restricted, thereby preventing looseness or squeak occurring between respective panels 11, 12 and 13.

Furthermore, according to the aforementioned embodiments, the slider 22 engages with the slider 21 in the sliding direction by means of the connecting link 20 rotatably connected to the slider 22. Thus, even in the deployed state of the sliding sunshade 10, or in a state in which the slider 22 is lifted upward relative to the slider 21, an engagement between the sliders 22 and 21 is kept since the connecting link 20 rotates relative to the sliders 22 and 21. Accordingly, the slider 22 shows a high following ability to the slider 21 in the roof vertical direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A sunshade device for a vehicle comprising:
  a first panel being slidable relative to a roof panel by receiving a driving force so as to open or close an opening portion formed in the roof panel of the vehicle;
  a second panel being slidable by receiving the driving force from the first panel so as to open or close the opening portion;
  a lifting mechanism for lifting the second panel upward relative to the first panel in a predetermined sliding position; and
  a link member provided between the first panel and the second panel and rotatably connected to the first panel and the second panel;
  wherein when the second panel is lifted upward relative to the first panel by the lifting mechanism, the link member rotates relative to the first panel and the second panel; and
  wherein the link member slidably engages with the first panel and includes an engaging/disengaging means for disabling the link member to slide relative to the first panel when the engaging/disengaging /means engages with the first panel, and for enabling the link member to slide relative to the first panel when the engaging/disengaging means disengages from the first panel.

2. A sunshade device for a vehicle according to claim 1, wherein the opening portion is equipped with a glass panel.

3. A sunshade device for a vehicle according to claim 1, further comprising guide rails arranged on respective side edges of the first panel and the second panel.

4. A sunshade device for a vehicle according to claim 1, further comprising a driving shoe fixed to at least one of side edges of the first panel, and connected to a driving mechanism.

5. A sunshade device for a vehicle according to claim 1, wherein the engaging/disengaging means includes a holding portion formed on the link member, and respective engaging shaft portions formed on the first panel and the second panel.

6. A sunshade device for a vehicle according to claim 5, wherein the holding portion has a downwardly concave shape.

7. A sunshade device for a vehicle according to claim 1, further comprising a biasing means disposed between the link member and the second panel.

8. A sunshade device for a vehicle according to claim 7, wherein the biasing means biases the second panel to rotate upward relative to the link member.

9. A sunshade device for a vehicle according to claim 7, wherein a biasing force of the biasing means is greater than a weight of the second panel.

* * * * *

UNITED STATES PATENT AND TRADEMARK OFFICE
CERTIFICATE OF CORRECTION

PATENT NO. : 7,229,125 B2  Page 1 of 1
APPLICATION NO. : 11/166201
DATED : June 12, 2007
INVENTOR(S) : Keiji Mori It is certified that error appears in the above-identified patent and that said Letters Patent is hereby corrected as shown below:

Claim 1, col. 8, line 9, "engaging/disengaging /means" should read --engaging/disengaging means--.

Signed and Sealed this

Sixteenth Day of October, 2007

JON W. DUDAS
*Director of the United States Patent and Trademark Office*